(12) United States Patent
Liu et al.

(10) Patent No.: US 12,126,864 B2
(45) Date of Patent: Oct. 22, 2024

(54) SCREEN INTERACTION METHOD AND APPARATUS FOR ELECTRONIC DEVICE

(71) Applicant: HUAWEI TECHNOLOGIES CO., LTD., Guangdong (CN)

(72) Inventors: Siwei Liu, Beijing (CN); Menghan Zhang, Beijing (CN); Ming Li, Beijing (CN); Haitao Wang, Beijing (CN); Peng Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/154,090

(22) Filed: Jan. 13, 2023

(65) Prior Publication Data
US 2023/0171467 A1 Jun. 1, 2023

Related U.S. Application Data

(63) Continuation of application No. PCT/CN2021/106352, filed on Jul. 14, 2021.

(30) Foreign Application Priority Data

Jul. 17, 2020 (CN) .......................... 202010696580.8

(51) Int. Cl.
*H04N 21/442* (2011.01)
*H04N 21/45* (2011.01)
*H04N 21/475* (2011.01)

(52) U.S. Cl.
CPC ... *H04N 21/44218* (2013.01); *H04N 21/4516* (2013.01); *H04N 21/4532* (2013.01); *H04N 21/475* (2013.01)

(58) Field of Classification Search
None
See application file for complete search history.

(56) References Cited

U.S. PATENT DOCUMENTS 6,982,780 B2 * 1/2006 Morley ............ H04N 21/41415
352/38
8,483,393 B2 * 7/2013 Robert ............. H04N 21/63345
380/278

(Continued)

FOREIGN PATENT DOCUMENTS

| CN | 104333793 A | 2/2015 |
| CN | 104750252 A | 7/2015 |

(Continued)

OTHER PUBLICATIONS

International Search Report and Written Opinion issued in PCT/CN2021/106352, dated Oct. 14, 2021, 9 pages.

(Continued)

*Primary Examiner* — Michael B. Pierorazio

(57) ABSTRACT

A screen interaction method and apparatus for an electronic device are disclosed, to determine a target user from a plurality of users and control a picture displayed on a screen of the electronic device based on an action of the target user. The method includes: obtaining, by using a camera, an image including the plurality of users in front of a screen, recognizing respective actions of the plurality of users in the image based on the image including the plurality of users, comparing the actions of the plurality of users with a preset action, determining a user who performs an action matching the preset action as the target user, and controlling a picture displayed on the screen of the electronic device based on the action of the target user.

15 Claims, 15 Drawing Sheets

(56) References Cited

U.S. PATENT DOCUMENTS

| | | | |
|---|---|---|---|
| 10,564,827 B2* | 2/2020 | Shigeta | G06F 3/017 |
| 2004/0088737 A1* | 5/2004 | Donlan | H04N 21/23113 |
| | | | 725/135 |
| 2007/0294710 A1* | 12/2007 | Meesseman | H04L 41/22 |
| | | | 719/328 |
| 2007/0294734 A1* | 12/2007 | Arsenault | H04N 21/4314 |
| | | | 725/87 |
| 2008/0114880 A1* | 5/2008 | Jogand-Coulomb | H04L 63/10 |
| | | | 709/227 |
| 2008/0194276 A1* | 8/2008 | Lin | H04L 61/5014 |
| | | | 455/466 |
| 2008/0270462 A1* | 10/2008 | Thomsen | G06F 16/2471 |
| 2009/0133090 A1* | 5/2009 | Busse | H04N 21/4755 |
| | | | 725/132 |
| 2010/0138297 A1* | 6/2010 | Fitzgerald | G06Q 30/0255 |
| | | | 715/764 |
| 2010/0138298 A1* | 6/2010 | Fitzgerald | H04L 63/10 |
| | | | 705/14.58 |
| 2010/0299264 A1* | 11/2010 | Berger | G06Q 30/0601 |
| | | | 705/59 |
| 2011/0154266 A1* | 6/2011 | Friend | A63F 13/213 |
| | | | 715/863 |
| 2013/0175333 A1* | 7/2013 | Gilbert | H04N 21/41407 |
| | | | 235/375 |
| 2013/0307774 A1* | 11/2013 | Hayashi | G06F 21/629 |
| | | | 345/158 |
| 2014/0373041 A1* | 12/2014 | Yan | H04N 21/4627 |
| | | | 725/27 |
| 2016/0349848 A1* | 12/2016 | Han | G06F 3/0304 |
| 2017/0168584 A1* | 6/2017 | Tanimura | G06F 3/017 |
| 2018/0107282 A1* | 4/2018 | Jeon | G06F 3/0483 |

FOREIGN PATENT DOCUMENTS

| | | | | |
|---|---|---|---|---|
| WO | 2012036790 A1 | 3/2012 | | |
| WO | WO-2013100250 A1 * | 7/2013 | | G06F 3/017 |

OTHER PUBLICATIONS

Extended European Search Report issued in EP21841917.4, dated Nov. 22, 2023, 8 pages.

* cited by examiner

TO

SCREEN INTERACTION METHOD AND APPARATUS FOR ELECTRONIC DEVICE

CROSS-REFERENCE TO RELATED APPLICATIONS

This application is a continuation of International Application No. PCT/CN2021/106352, filed on Jul. 14, 2021, which claims priority to Chinese Patent Application No. 202010696580.8, filed on Jul. 17, 2020. The disclosures of the aforementioned applications are hereby incorporated by reference in their entireties.

TECHNICAL FIELD

This application relates to the field of smart screens, and in particular, to a screen interaction method and apparatus for an electronic device.

BACKGROUND

With development of artificial intelligence (AI), smart devices are more popular among users. For example, a smart television may recognize a user body action by using a human body recognition technology, and control a picture displayed on a screen based on the user body action, to perform an interaction function between a screen and a user. Identifying a target user is a key to performing the interaction function between the screen and the user. However, a large-screen electronic device such as the smart television is usually disposed in a public area such as a living room, and a plurality of users may simultaneously perform actions to control the picture displayed on the screen. In this case, it is urgent to determine which user body action is for timely screen control of the smart television.

SUMMARY

The present disclosure provides a screen interaction method and apparatus for an electronic device, to determine a screen control target user from a plurality of users and control a picture displayed on a screen of an electronic device based on an action of the target user.

To achieve the foregoing objective, the present disclosure uses the following technical solutions.

According to a first aspect, an embodiment of the present disclosure provides a screen interaction method for an electronic device. The method may be applied to an electronic device, or the method may be applied to an apparatus that can support the electronic device to implement the method. For example, the apparatus includes a chip system. The method includes: The electronic device obtains an image including N users by using a camera, recognizes respective actions of the N users based on the image including the N users, compares the respective actions of the N users with a preset action, determines a user who performs an action matching the preset action as a target user, and controls a picture displayed on a screen of the electronic device based on the action of the target user. N is an integer greater than or equal to 2. Optionally, the preset action includes swinging a forearm, forking a left arm, forking a right arm, forking two arms, nodding, and clenching a fist.

An embodiment of the present disclosure provides a screen interaction method for an electronic device. The method may be applied to an electronic device including a display and a camera. In this method, the electronic device does not need to pay attention to control permission of a user. When the user performs an action matching a preset action, the electronic device considers the user as a target user, so that the target user is quickly determined. The electronic device controls a picture displayed on a screen of the electronic device in response to the action of the user, namely, based on the action of the target user. This effectively improves user experience when the user selects a program on the electronic device.

In a possible implementation, there are M target users, where M is an integer, and $2 \leq M \leq N$. It may be understood that the electronic device identifies two or more target users, and actions of the two or more target users match the preset action. In this case, if the M target users include a target user having control permission, the electronic device controls the picture displayed on the screen of the electronic device based on an action of the target user having control permission in the M target users. The target user having control permission is a target user who has interacted with the electronic device within a preset duration. If the two or more target users do not have control permission, the electronic device may prompt a user how to perform control, and the electronic device controls the picture displayed on the screen of the electronic device based on an action of a target user indicated by the user. This resolves a conflict problem generated when two or more users simultaneously control the picture displayed on the screen of the electronic device, so that the electronic device can control the picture displayed on the screen of the electronic device in timely response to the action of the user and based on the action of the target user. This improves user experience when the user selects a program on the electronic device.

In some embodiments, if the two or more target users do not have control permission, and the electronic device has assigned control permission to another user, before controlling the picture displayed on the screen of the electronic device based on the action of the target user, the electronic device transfers the control permission from the user having control permission to the target user indicated by the user. If the electronic device does not assign control permission to any user, before controlling the picture displayed on the screen of the electronic device based on the action of the target user, the electronic device assigns control permission to the target user indicated by the user. In this way, the target user indicated by the user has the control permission, and the electronic device controls the picture displayed on the screen of the electronic device based on the action of the target user indicated by the user.

In an example embodiment, if the preset action is a menu selection action, the controlling a picture displayed on a screen of the electronic device based on the action of the target user includes: controlling, based on a swing angle of a forearm of the target user, a pointer displayed on the screen of the electronic device to point to an option on a menu. The menu displayed on the screen of the electronic device is a pie menu or a roulette menu. In some embodiments, in an operation manner, a polar coordinate system is used as a basic operation dimension. In a roulette user interface (UI), a forearm that is a pole axis, an elbow that is a pole point, and a forearm pointing angle that is a basic operation dimension correspond to the roulette UI. In cooperation with gesture recognition, human-machine interaction functions such as quick and accurate selection and determining are implemented. Because it is difficult to define a coordinate origin and a coordinate value range, in the present disclosure, a polar coordinate is used as a basis of a mapping relationship, which is different from an interactive mapping relationship mainly based on a rectangular coordinate system (Descartes coordinate system), to resolve a problem that in the rectangular coordinate system, body actions do not naturally correspond to screen coordinates. The coordinate origin (the elbow is the pole point) and the coordinate value range (0 to 360 degrees) may be naturally defined, so that body actions are more naturally mapped to a screen coordinate system. This reduces interaction space for body interaction, and reduces a fatigue degree of body interaction. Different from an interaction manner in which only hand information is used, an interaction manner of body recognition and gesture recognition is used, so that diversity and flexibility of an interaction instruction are improved, a more complex operation can be performed, and instruction efficiency is improved.

According to a second aspect, an embodiment of the present disclosure provides a screen interaction method for an electronic device. The method may be applied to an electronic device, or the method may be applied to an apparatus that can support the electronic device to implement the method. For example, the apparatus includes a chip system. The method includes: The electronic device obtains an image including N users, determines, based on the image including the N users, whether the N users include a user having control permission, if the N users include a user having control permission, compares an action of the user having control permission with a preset action, if the action of the user having control permission matches the preset action, determines the user having control permission as a target user having control permission, and controls a picture displayed on a screen of the electronic device based on the action of the target user having control permission. N is an integer greater than or equal to 2. In this way, after the user having control permission is determined, the action of the user having control permission is recognized, so that a duration for determining is shortened, and the electronic device responds to an operation of the user in time. If the N users do not include a user having control permission, respective actions of the N users are compared with the preset action to determine M target users in the N users, and one of the M target users is determined as the target user having control permission. An action of the target user matches the preset action. M is an integer, and $1 \leq M \leq N$.

In a possible implementation, $M \geq 2$, and the determining one target user as a target user having control permission includes: assigning control permission to the one target user indicated by a user, and determining the one target user indicated by the user as the target user having control permission. This resolves a conflict problem generated when two or more users simultaneously control the picture displayed on the screen of the electronic device, so that the electronic device can control the picture displayed on the screen of the electronic device in timely response to the action of the user and based on the action of the target user. This improves user experience when the user selects a program on the electronic device.

According to a third aspect, an embodiment of the present disclosure further provides a screen interaction apparatus for an electronic device. For beneficial effects, refer to the descriptions in the first aspect. Details are not described herein again. The screen interaction apparatus for an electronic device has a function of implementing behavior in the foregoing method embodiment of the first aspect. The function may be implemented by hardware, or may be implemented by hardware executing corresponding software. The hardware or the software includes one or more modules corresponding to the foregoing function. In an example embodiment, the screen interaction apparatus for an electronic device includes a processing unit. The processing unit is configured to obtain an image including N users, where N is an integer greater than or equal to 2. The processing unit is further configured to recognize respective actions of the N users based on the image including the N users. The processing unit is further configured to determine a target user based on the respective actions of the N users, where an action of the target user matches a preset action. The processing unit is further configured to control a picture displayed on a screen of an electronic device based on the action of the target user. These units may perform the corresponding functions in the method example in the first aspect. For details, refer to the detailed descriptions in the method example. Details are not described herein again.

According to a fourth aspect, an embodiment of the present disclosure further provides a screen interaction apparatus for an electronic device. For beneficial effects, refer to the descriptions in the second aspect. Details are not described herein again. The screen interaction apparatus for an electronic device has a function of implementing behavior in the foregoing method embodiment of the second aspect. The function may be implemented by hardware, or may be implemented by hardware executing corresponding software. The hardware or the software includes one or more modules corresponding to the foregoing function. In an example embodiment, the screen interaction apparatus for an electronic device includes a processing unit. The processing unit is configured to obtain an image including N users, where N is an integer greater than or equal to 2. The processing unit is further configured to determine, based on the image including the N users, whether the N users include a user having control permission. The processing unit is further configured to: if the N users include a user having control permission, determine the user having control permission as a target user having control permission, where an action of the target user having control permission matches a preset action. The processing unit is further configured to: if the N users do not include a user having control permission, and the N users include M target users, determine one target user as a target user having control permission, where an action of the target user matches a preset action, M is an integer, and $1 \leq M \leq N$. The processing unit is further configured to control a picture displayed on a screen of an electronic device based on the action of the target user having control permission. These units may perform the corresponding functions in the method example in the second aspect. For details, refer to the detailed descriptions in the method example. Details are not described herein again.

According to a fifth aspect, an example electronic device is provided. The electronic device may include a processor, a memory, a display, and a camera. The processor is coupled to the display, the camera, and the memory. The memory is configured to store computer program code. The computer program code includes computer software instructions. When the computer software instructions are executed by the electronic device, the electronic device is enabled to perform the following operations: The electronic device obtains an image including N users by using the camera, recognizes respective actions of the N users based on the image including the N users, determines a target user based on the respective actions of the N users, where an action of the target user matches a preset action, and controls a picture displayed on a screen of the electronic device based on the action of the target user. N is an integer greater than or equal to 2.

According to a sixth aspect, an example computer-readable storage medium is provided, including computer software instructions. When the computer software instructions are run on an electronic device, the electronic device is enabled to perform the screen interaction method for an electronic device according to any one of the first aspect or the possible implementations of the first aspect, or the second aspect or the possible implementations of the second aspect.

According to a seventh aspect, a computer program product is provided. When the computer program product runs on a computer, the computer is enabled to perform the screen interaction method for an electronic device according to any one of the first aspect or the possible implementations of the first aspect, or the second aspect or the possible implementations of the second aspect.

According to an eighth aspect, an example chip system is provided. The chip system is applied to an electronic device. The chip system includes an interface circuit and a processor. The interface circuit and the processor are interconnected through a line. The interface circuit is configured to receive a signal from a memory of the electronic device, and send the signal to the processor. The signal includes computer instructions stored in the memory. When the processor executes the computer instructions, the chip system performs the screen interaction method for an electronic device according to any one of the first aspect or the possible implementations of the first aspect, or the second aspect or the possible implementations of the second aspect.

It should be understood that, descriptions of technical features, technical solutions, beneficial effect, or similar words in the present disclosure do not imply that all features and advantages can be implemented in any individual embodiment. On the contrary, it may be understood that, the descriptions of the features or the beneficial effect mean that at least one embodiment includes a specific technical feature, technical solution, or beneficial effect. Therefore, the descriptions of the technical features, the technical solutions, or the beneficial effect in the present disclosure may not necessarily be specific to a same embodiment. Further, the technical features, the technical solutions, and the beneficial effect described in embodiments may be combined in any proper manner. A person skilled in the art may understand that an embodiment may be implemented without one or more specific technical features or technical solutions, or beneficial effect in a specific embodiment. In other embodiments, additional technical features and beneficial effect may be further identified in a specific embodiment that does not reflect all embodiments.

DESCRIPTION OF EMBODIMENTS

In the present disclosure, the claims, and the accompanying drawings of the present disclosure, the terms "first", "second", "third", and the like are intended to distinguish between different objects but do not limit a particular order.

In embodiments of the present disclosure, the word "example" or "for example" is used to represent giving an example, an illustration, or a description. Any embodiment or design scheme described as "example" or "for example" in embodiments of the present disclosure should not be explained as being more preferred or having more advantages than another embodiment or design scheme. Specifically, use of the word "example", "for example", or the like is intended to present a related concept in a specific manner.

An electronic device in embodiments of the present disclosure may be a television, a tablet computer, a projector, a mobile phone, a desktop computer, a laptop computer, a handheld computer, a notebook computer, an ultra-mobile personal computer (UMPC), a netbook, or a device including a display and a camera, such as a personal digital assistant (PDA), or an augmented reality (AR)/virtual reality (VR) device. A specific form of the electronic device is not specifically limited in embodiments of the present disclosure.

Figure 1:
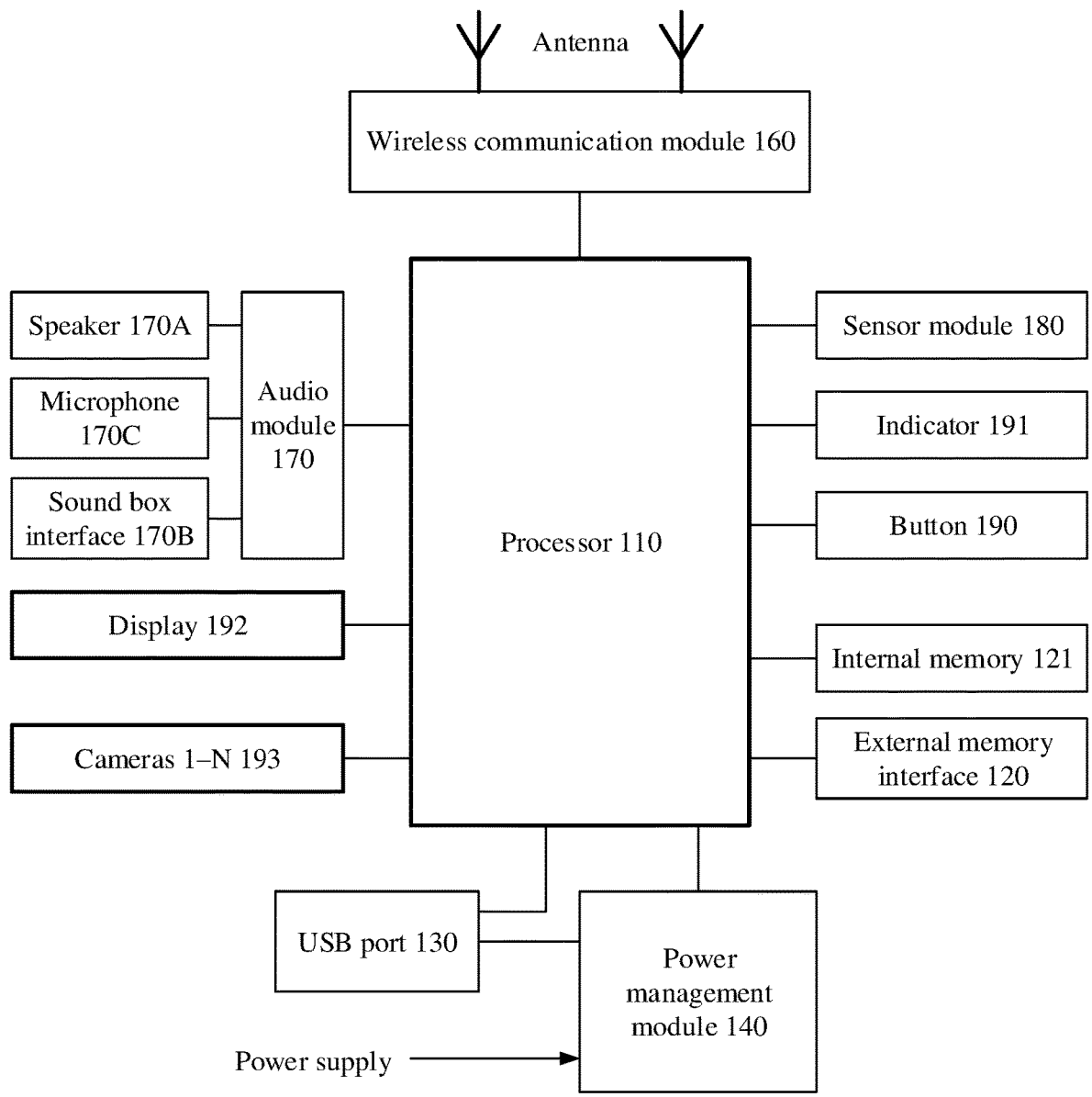
FIG. 1 is a schematic diagram of a structure of an electronic device according to an embodiment of the present disclosure.

FIG. 1 is a schematic diagram of a structure of an electronic device according to an embodiment of the present disclosure. As shown in FIG. 1, the electronic device includes a processor 110, an external memory interface 120, an internal memory 121, a universal serial bus (USB) port 130, a power management module 140, an antenna, a wireless communication module 160, an audio module 170, a speaker 170A, a sound box interface 170B, a microphone 170C, a sensor module 180, a button 190, an indicator 191, a display 192, a camera 193, and the like. The sensor module 180 may include a distance sensor, an optical proximity sensor, a fingerprint sensor, a temperature sensor, a touch sensor, an ambient light sensor, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

In this embodiment, the processor 110 is configured to: obtain, by using the camera 193, an image including N users, recognize respective actions of the N users based on the image including the N users, determine a user who performs an action matching a preset action in the actions of the N users as a target user, and control an image displayed on the display 192 of the electronic device based on the action of the target user, where N is an integer greater than or equal to 2.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a USB interface, and/or the like.

The power management module 140 is configured to connect to a power supply. The power management module 140 may be further connected to the processor 110, the internal memory 121, the display 192, the camera 193, the wireless communication module 160, and the like. The power management module 140 receives input of the power supply and supplies power to the processor 110, the internal memory 121, the display 192, the camera 193, the wireless communication module 160, and the like. In some embodiments, the power management module 140 may alternatively be disposed in the processor 110.

A wireless communication function of the electronic device may be implemented by using the antenna, the wireless communication module 160, or the like. The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device.

The wireless communication module 160 may be one or more components integrating at least one communication processor module. The wireless communication module 160 receives an electromagnetic wave through an antenna, performs frequency modulation and filtering processing on the electromagnetic wave signal, and sends the processed signal to the processor 110. The wireless communication module 160 may further receive a to-be-sent signal from the processor 110, perform frequency modulation and amplification on the to-be-sent signal, and convert the signal into an electromagnetic wave through the antenna and radiate the signal. In some embodiments, the antenna of the electronic device is coupled to the wireless communication module 160, so that the electronic device may communicate with a network and another device by using a wireless communication technology.

The electronic device implements a display function by using the GPU, the display 192, the application processor, and the like. The GPU is a microprocessor for image processing, and is connected to the display 192 and the application processor. The GPU is configured to perform mathematical and geometric computation, and render an image. The processor 110 may include one or more GPUs, which execute program instructions to generate or change display information.

The display 192 is configured to display an image, a video, and the like. The display 192 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light emitting diode (QLED), or the like.

The electronic device may implement a photographing function by using the ISP, the camera 193, the video codec, the GPU, the display 192, the application processor, and the like. The ISP is configured to process data fed back by the camera 193. In some embodiments, the ISP may be disposed in the camera 193.

Figure 2:
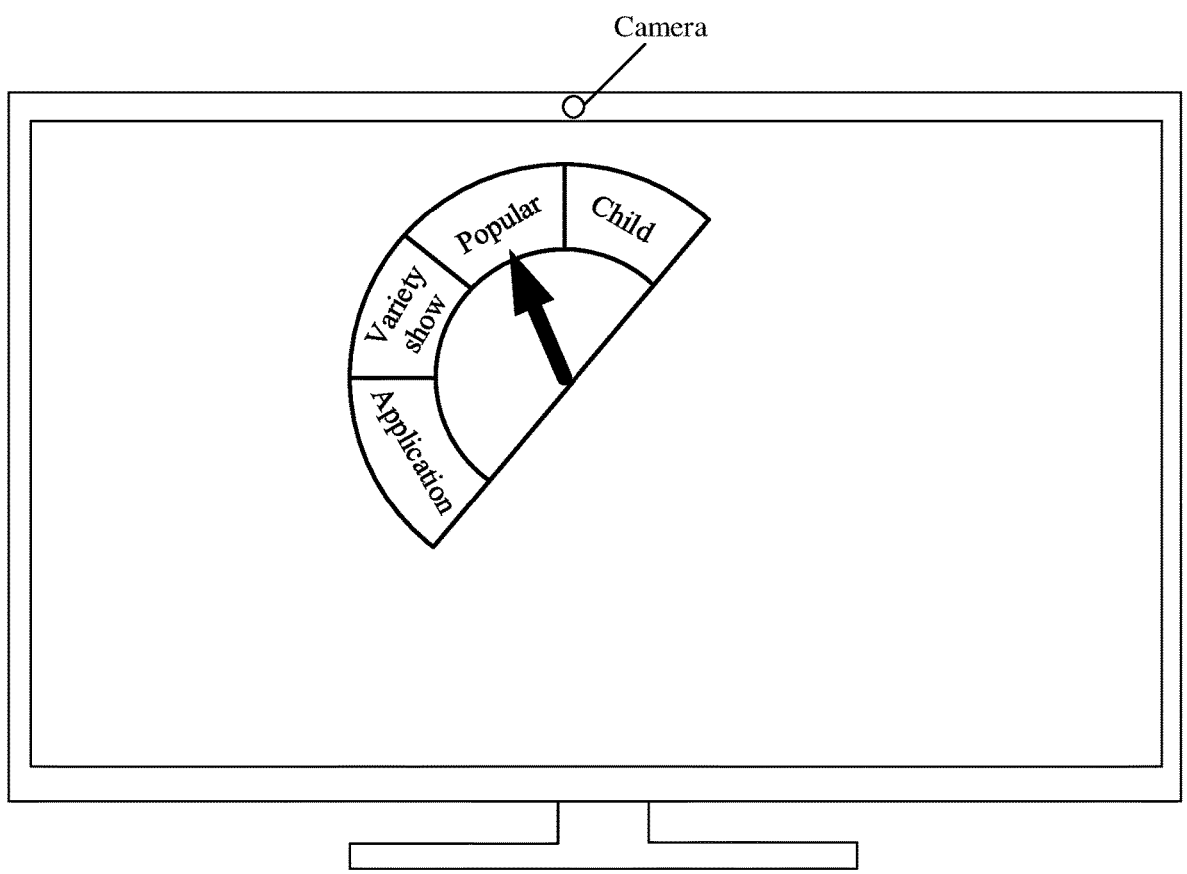
FIG. 2 is a schematic diagram of a camera of a television according to an embodiment of the present disclosure.

The camera 193 is configured to capture a static image or a video. An optical image of an object is generated through a lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1. For example, the electronic device is a television. As shown in FIG. 2, the camera 193 may be disposed at an upper edge of the display 192 of the television. Certainly, a location of the camera 193 on the electronic device is not limited in embodiments of the present disclosure.

Alternatively, the electronic device may not include a camera. In other words, the camera 193 is not disposed in the electronic device (for example, the television). The electronic device may be externally connected to the camera 193 through an interface (for example, the USB port 130). The external camera 193 may be fastened to the electronic device by using an external fastener (for example, a camera support with a clip). For example, the external camera 193 may be fastened to an edge such as an upper side edge of the display 192 of the electronic device by using the external fastener.

The digital signal processor is configured to process a digital signal, and may process another digital signal in addition to the digital image signal. For example, when the electronic device selects a frequency, the digital signal processor is configured to perform Fourier transform on frequency energy. The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) processing unit. The NPU quickly processes input information with reference to a structure of a biological neural network, for example, a transfer mode between human brain neurons, and may further continuously perform self-learning. The NPU can implement applications such as intelligent cognition of the electronic device, for example, image recognition, facial recognition, voice recognition, and text understanding.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage region and a data storage region. The program storage region may store an operating system, an application required by at least one function (for example, a sound playing function or an image playing function), and the like. The data storage region may store data (such as audio data) created during use of the electronic device, and the like. In addition, the internal memory 121 may include a high-speed random access memory, or may include a nonvolatile memory such as at least one disk storage device, a flash memory, or a universal flash storage (UFS).

The electronic device may implement an audio function such as music playing or recording by using the audio module 170, the speaker 170A, the microphone 170C, the sound box interface 170B, the application processor, and the like. In this embodiment, the microphone 170C may be configured to receive a voice instruction sent by a user to the electronic device. The loudspeaker 170A may be configured to feed back a decision instruction of the electronic device to the user.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110. The speaker 170A, also referred to as a "loudspeaker", is configured to convert an audio electrical signal into a sound signal. The microphone 170C, also referred to as a "mike" or a "mic", is configured to convert a sound signal into an electrical signal.

The sound box interface 170B is configured to connect to a wired sound box. The sound box interface 170B may be the USB port 130, or may be a 3.5 mm open mobile electronic device platform (OMTP) standard interface, or a cellular telecommunications industry association of the USA (CTIA) standard interface.

The button 190 includes a power button, a volume button, and the like. The button 190 may be a mechanical button, or may be a touch-sensitive button. The electronic device may receive a button input, and generate a button signal input related to user settings and function control of the electronic device.

The indicator 191 may be an indicator light, and may be configured to indicate that the electronic device is in a power-on mode, a standby mode, a power-off mode, or the like. For example, if the indicator light is off, it may be indicated that the electronic device is in the power-off mode; if the indicator light is green or blue, it may be indicated that the electronic device is in the power-on mode; and if the indicator light is red, it may be indicated that the electronic device is in the standby mode.

It may be understood that the structure shown in this embodiment of the present disclosure does not constitute a specific limitation on the electronic device. The television may have more or fewer components than those shown in FIG. 1, may combine two or more components, or may have a different component configuration. For example, the electronic device may further include a component such as a sound box. Various components shown in FIG. 1 may be implemented in hardware, software, or a combination of hardware and software that includes one or more signal processing or application-specific integrated circuits.

All methods in the following embodiments may be implemented in the electronic device having the foregoing hardware structure. In the following embodiment, an example in which the electronic device is a television is used to describe the method in embodiments of the present disclosure.

Figure 3:
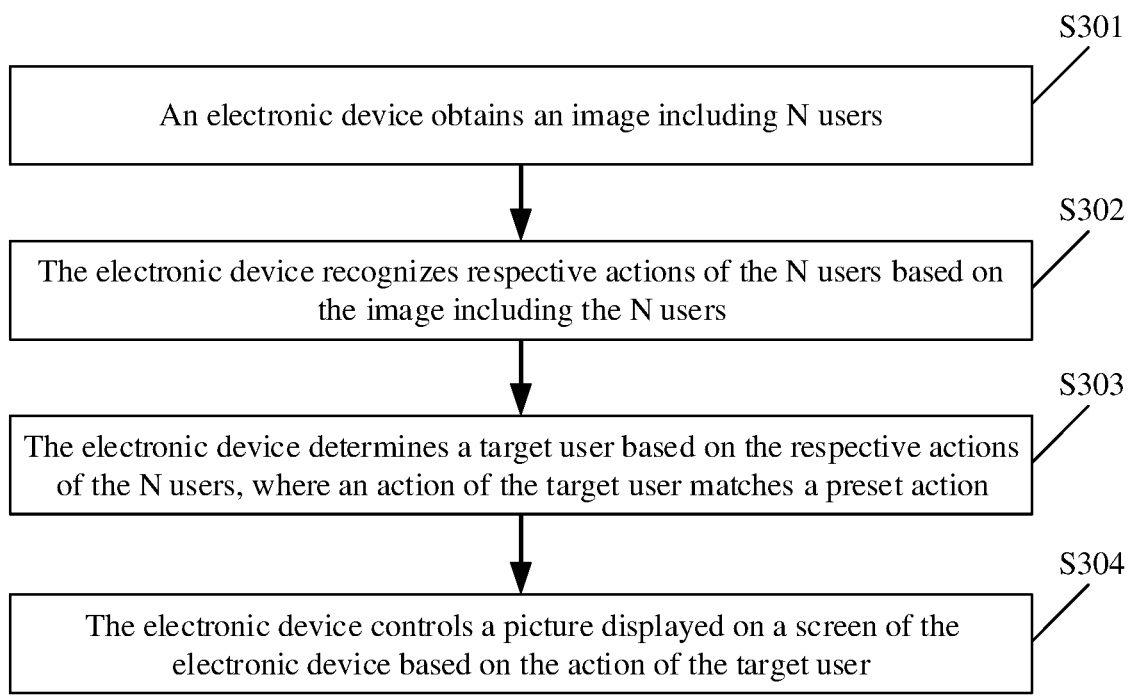
FIG. 3 is a schematic flowchart of a screen interaction method for an electronic device according to an embodiment of the present disclosure.

FIG. 3 is a schematic flowchart of a screen interaction method for an electronic device according to an embodiment of the present disclosure. As shown in FIG. 3, the method may include the following steps.

S301: An electronic device obtains an image including N users.

A user turns on the electronic device, and the electronic device displays a home screen. A method in which the user turns on the electronic device is not limited in embodiments of the present disclosure. In a possible implementation, the user may turn on the electronic device through speech. For example, the user says "turn on the television", and the smart television is turned on after receiving a voice instruction of "turn on the television". In another possible implementation, the user may turn on the electronic device by using a remote control. The user presses an on/off button, and the television is turned on after receiving an on instruction.

After the electronic device is turned on, the user may control the electronic device to start a camera. The electronic device captures an image in front of a display of the electronic device by using the camera. A method in which the user can control the electronic device to start the camera is not limited in embodiments of the present disclosure. For example, the user may control, by using the voice instruction, the electronic device to start the camera, or the user controls, by using the remote control, the electronic device to start the camera. The image in front of the display includes a scene in a partial or complete region of a field of view (FOV) of the camera. If there is a person in the scene in the partial or complete region of the field of view of the camera, the image includes an image of at least one user. In this embodiment, it is assumed that the image captured by the camera includes images of the N users, where N is an integer greater than or equal to 2.

Figure 4:
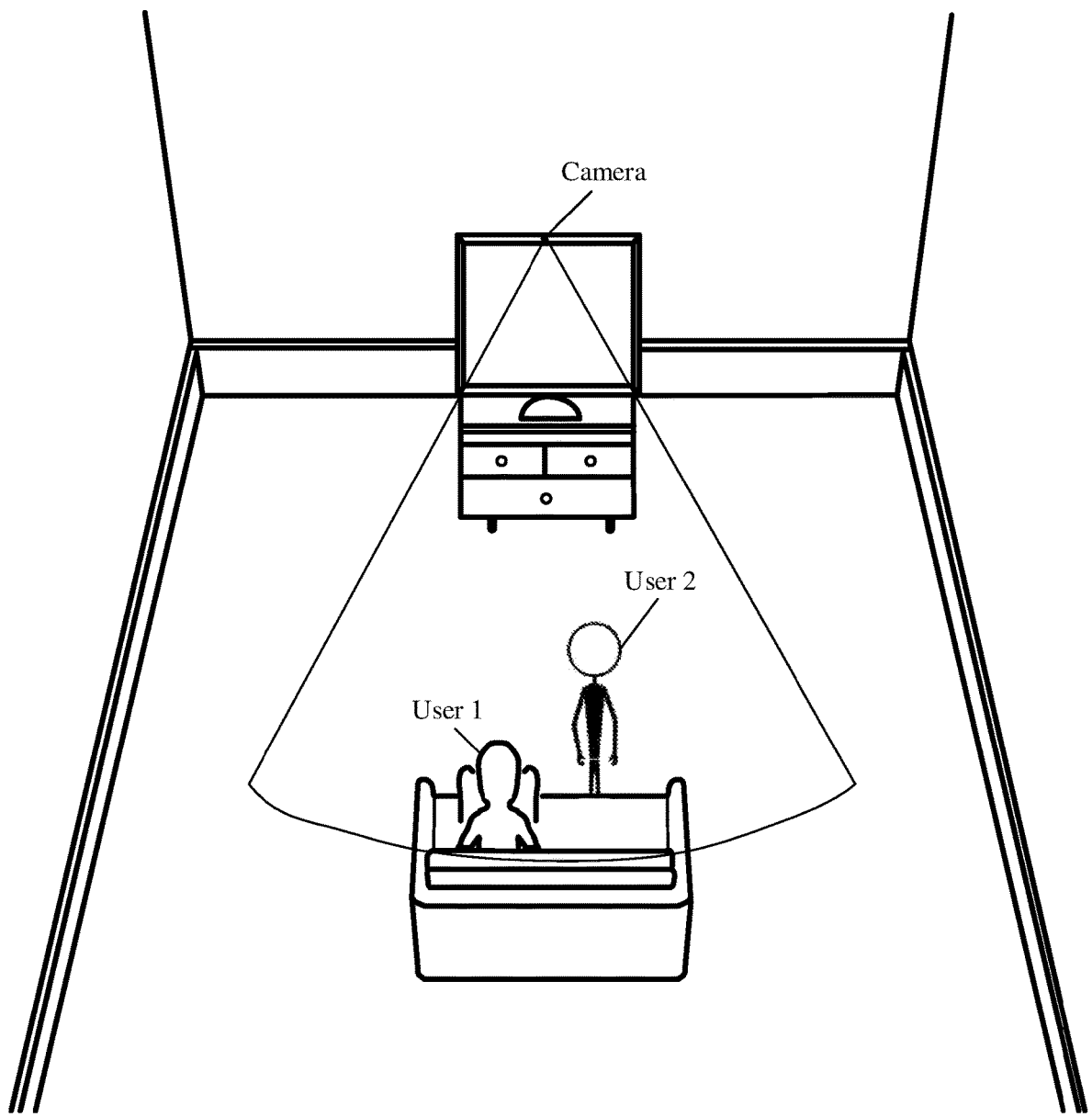
FIG. 4 is a schematic diagram in which a smart television captures an image by using a camera according to an embodiment of the present disclosure.

For example, as shown in FIG. 4, the smart television captures images of all the users in the image (for example, a sector range in FIG. 4) by using the camera. The sector range includes a user 1 and a user 2. The user 1 sits on a sofa, and the user 2 is standing. The smart television captures an image of the user 1 and an image of the user 2 by using the camera.

It should be noted that a user image captured by the camera in the image is a complete image of a user, and the complete image of the user includes a head, limbs, and a body. Alternatively, a user image captured by the camera in the image is an upper body image of a user, and the upper body image of the user includes a head, upper limbs, and a body. Alternatively, a user image captured by the camera is an incomplete image, and the incomplete image may be a left image or a right image of a user. The left image includes a left portion of a head, an upper left limb, a lower left limb, and a left body. The right image includes a right portion of a head, an upper right limb, a lower right limb, and a right body. If the user image captured by the camera is an incomplete image, the electronic device considers that the user image is unavailable, and statistics is not performed on the user image.

S302: The electronic device recognizes respective actions of the N users based on the image including the N users.

The electronic device may recognize a human pose of each of the N users in the image according to a human pose estimation algorithm. The human pose estimation algorithm is an algorithm for detecting a human key point by training a neural network model, and describing a human pose based on the human key point.

Figure 5:
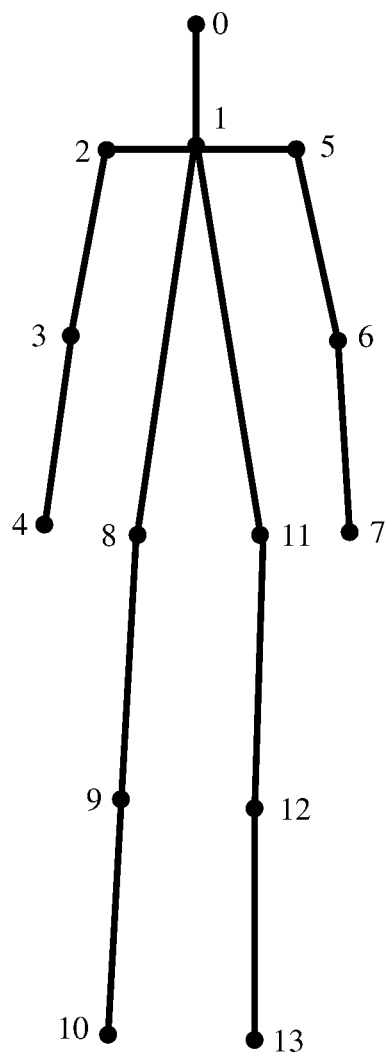
FIG. 5 is a schematic diagram of a human body joint recognition result according to an embodiment of the present disclosure.

For example, the human pose estimation algorithm may recognize at least ten human points, such as a head, shoulders, elbows, wrists, hips, knees, and ankles. Table 1 describes recognizable human body joints. FIG. 5 is a schematic diagram of a human body joint recognition result according to an embodiment of the present disclosure.

TABLE 1

| Joint No. | Joint description |
| --- | --- |
| 0 | Head top |
| 1 | Neck |
| 2 | Right shoulder |
| 3 | Right elbow |
| 4 | Right wrist |
| 5 | Left shoulder |
| 6 | Left elbow |
| 7 | Left wrist |
| 8 | Right hip |
| 9 | Right knee |
| 10 | Right ankle |
| 11 | Left hip |
| 12 | Left knee |
| 13 | Left ankle |
| 14 | Human body center |

An action is a process of a position change (expression change) of facial features of an object, a position change (movement change) of limbs of the object, and a position change (movement distance change) of the object relative to an environment. The electronic device may recognize human poses of the N users in a plurality of consecutive frames according to the human pose estimation algorithm, and determine the respective actions of the users based on the respective human poses of the N users in the plurality of consecutive frames.

S303: The electronic device determines a target user based on the respective actions of the N users, where an action of the target user matches a preset action.

It may be understood that the electronic device is usually disposed in a public area such as a living room. If the picture displayed on the display of the electronic device may be controlled by any action of a user, user intention may be violated, resulting in poor user experience. For example, when the user walks in front of the electronic device, although the user does not want to pause the picture displayed on the display of the electronic device, the picture displayed on the display of the electronic device is paused. Therefore, the electronic device may preset a body action. The user performs the preset action. The electronic device determines whether the action of the user matches the preset action, and determines the user who performs the action matching the preset action as the target user. The electronic device controls, based on the preset action, the picture displayed on the display of the electronic device. The preset action is a body action preset by the electronic device. In the present disclosure, the target user is the user who performs the preset action. It may be understood that the action matching the preset action is an action that is the same as the preset action. When determining that the action of the user is completely the same as the preset action, the electronic device considers that the action of the user matches the preset action, and the user is the target user.

Alternatively, the action matching the preset action is an action that is approximately the same as the preset action. When determining that the action of the user is approximately the same as the preset action, the electronic device considers that the action of the user matches the preset action, and the user is the target user.

For example, the preset action is swinging a forearm, and an angle of swinging the forearm is 45 degrees. If the angle at which the user swings the forearm is 30 degrees, when determining that the action of the user is swinging the forearm, the electronic device considers that the action of the user matches the preset action, and the user is the target user.

For another example, the preset action is forking a left arm. Forking means bending an elbow and placing five fingers on a waist. If the user does not place the five fingers of a left hand on the waist, but holds a first and places the first on the waist, the electronic device may also determine that the action of the user is forking a left arm, and consider that the action of the user matches the preset action, and the user is the target user.

If the electronic device determines that the action of the user does not match the preset action, the user is not the target user. If the image captured by the camera of the electronic device does not include the target user, S301 is performed again.

In the present disclosure, the preset action includes but is not limited to swinging a forearm, forking a left arm, forking a right arm, forking two arms, nodding, and clenching a fist.

Figure 6:
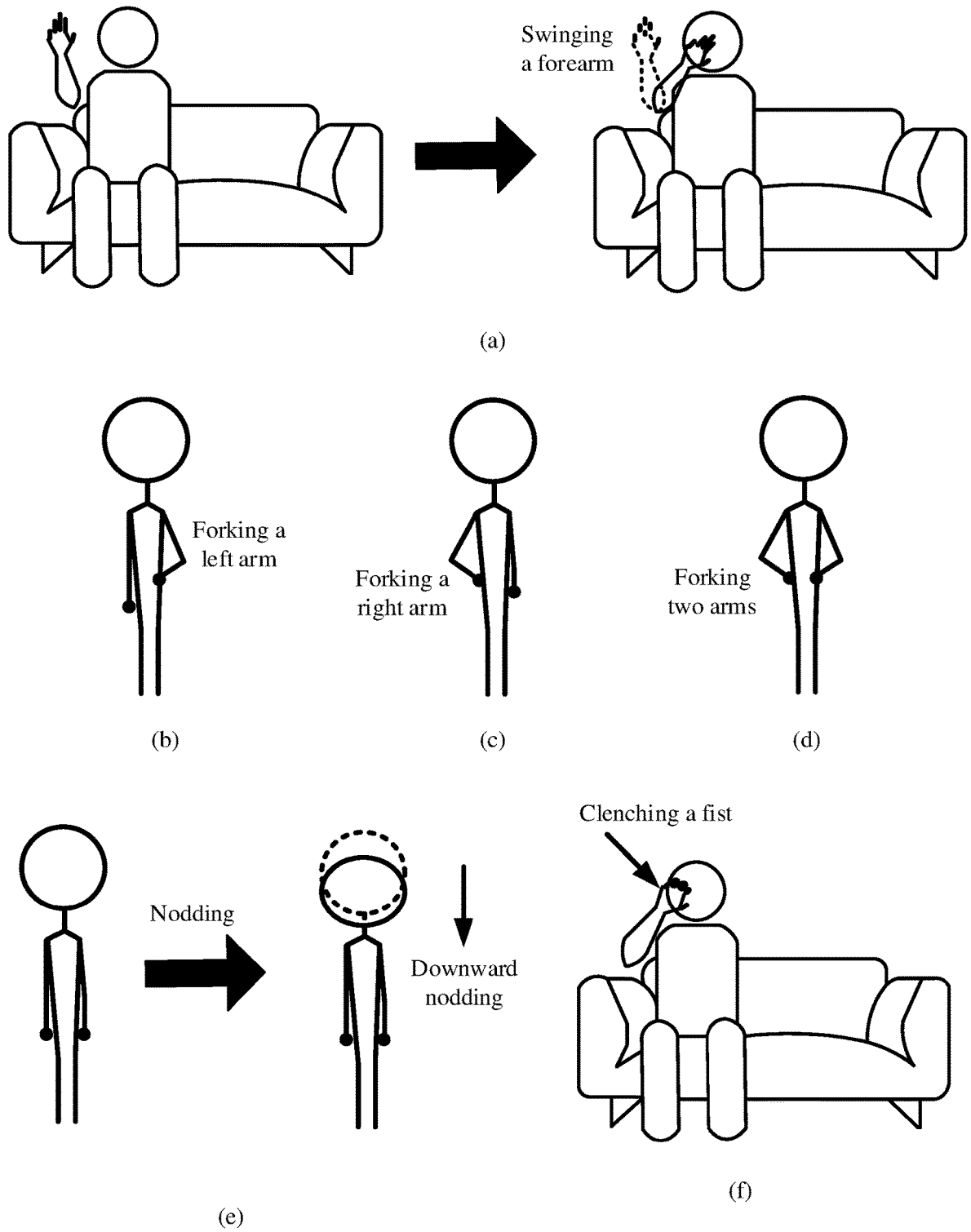
FIG. 6 is a schematic diagram of a preset action according to an embodiment of the present disclosure.

Swinging a forearm may mean that the user shakes the forearm leftward and rightward. A schematic diagram of swinging a forearm is shown in (a) in FIG. 6.

Forking a left arm means bending an elbow of a left arm and placing five fingers on a waist. A schematic diagram of forking a left arm is shown in (b) in FIG. 6.

Forking a right arm means bending an elbow of a right arm and placing five fingers on a waist. A schematic diagram of forking a right arm is shown in (c) in FIG. 6.

Forking two arms means bending an elbow of a right arm and placing five fingers on a waist, and bending an elbow of a left arm and placing five fingers on the waist. A schematic diagram of forking two arms is shown in (d) in FIG. 6.

Nodding means quickly lowering a head. A schematic diagram of nodding is shown in (e) in FIG. 6.

Clenching a first means bending fingers toward the center of a palm to form a fist. A schematic diagram of clenching a first is shown in (f) in FIG. 6.

Different actions indicate different operations on content displayed on the display of the electronic device. For example, swinging a forearm indicates menu selection. For another example, forking a left arm indicates returning to a previous level. For another example, forking a right arm indicates entering a next level. For another example, forking two arms indicates returning to the home screen. For another example, nodding indicates a determining action. For another example, clenching a first indicates a determining action. For another example, swinging a forearm leftward and rightward indicates releasing control permission. An operation corresponding to the preset action is not limited in embodiments of the present disclosure.

S304: The electronic device controls a picture displayed on a screen of the electronic device based on the action of the target user.

Figure 7:
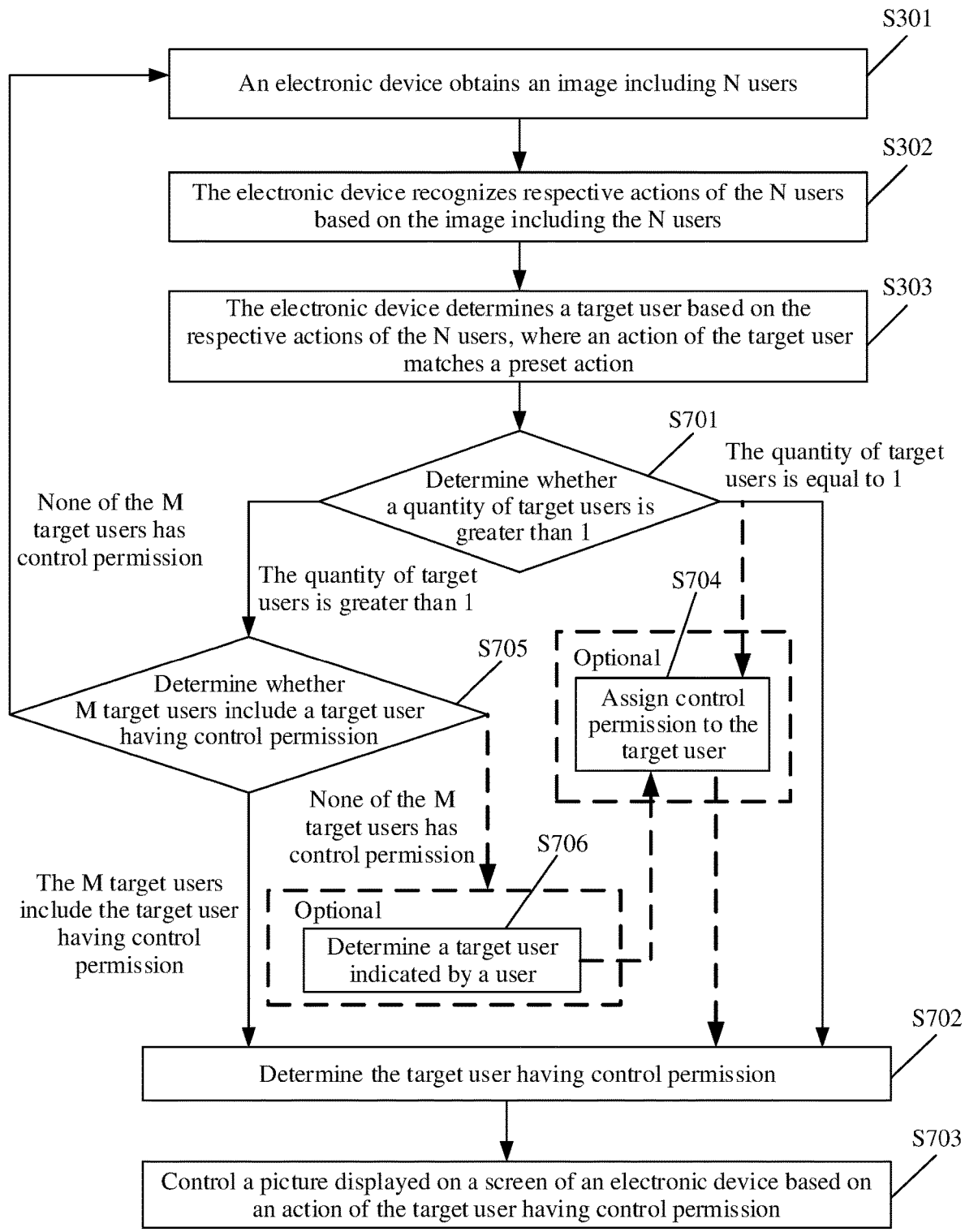
FIG. 7 is a schematic flowchart of a screen interaction method for an electronic device according to an embodiment of the present disclosure.

That the electronic device controls a picture displayed on a screen of the electronic device based on the action of the target user may include steps shown in FIG. 7. If a quantity of target users is 0, it indicates that the user in the image captured by the camera of the electronic device does not perform any preset action, and S301 is performed again. If a quantity of target users is not 0, the electronic device determines whether the quantity of the target users is greater than 1 (S701).

If the quantity of the target users is equal to 1, the electronic device determines a target user having control permission (S702), and controls the picture displayed on the screen of the electronic device based on an action of the target user having control permission (S703). If the action of the target user having control permission is an action of releasing control permission, the electronic device releases control permission, and S301 is performed again. The target user having control permission is a target user who has interacted with the electronic device within a preset duration. Interaction with the electronic device may be understood as that the target user performs the preset action, and the electronic device responds to the preset action. For example, the preset duration is 1 minute. The preset duration is not limited in embodiments of the present disclosure, and the user may set the preset duration based on a user requirement.

In a first possible scenario, the electronic device determines a target user. In this case, regardless of content displayed on the display of the electronic device and whether the target user has control permission to control the electronic device, the electronic device controls the picture displayed on the screen of the electronic device in response to an action of the target user. Therefore, the electronic device responds to a user operation on the electronic device in a timely manner.

Figures 8A, 8B:
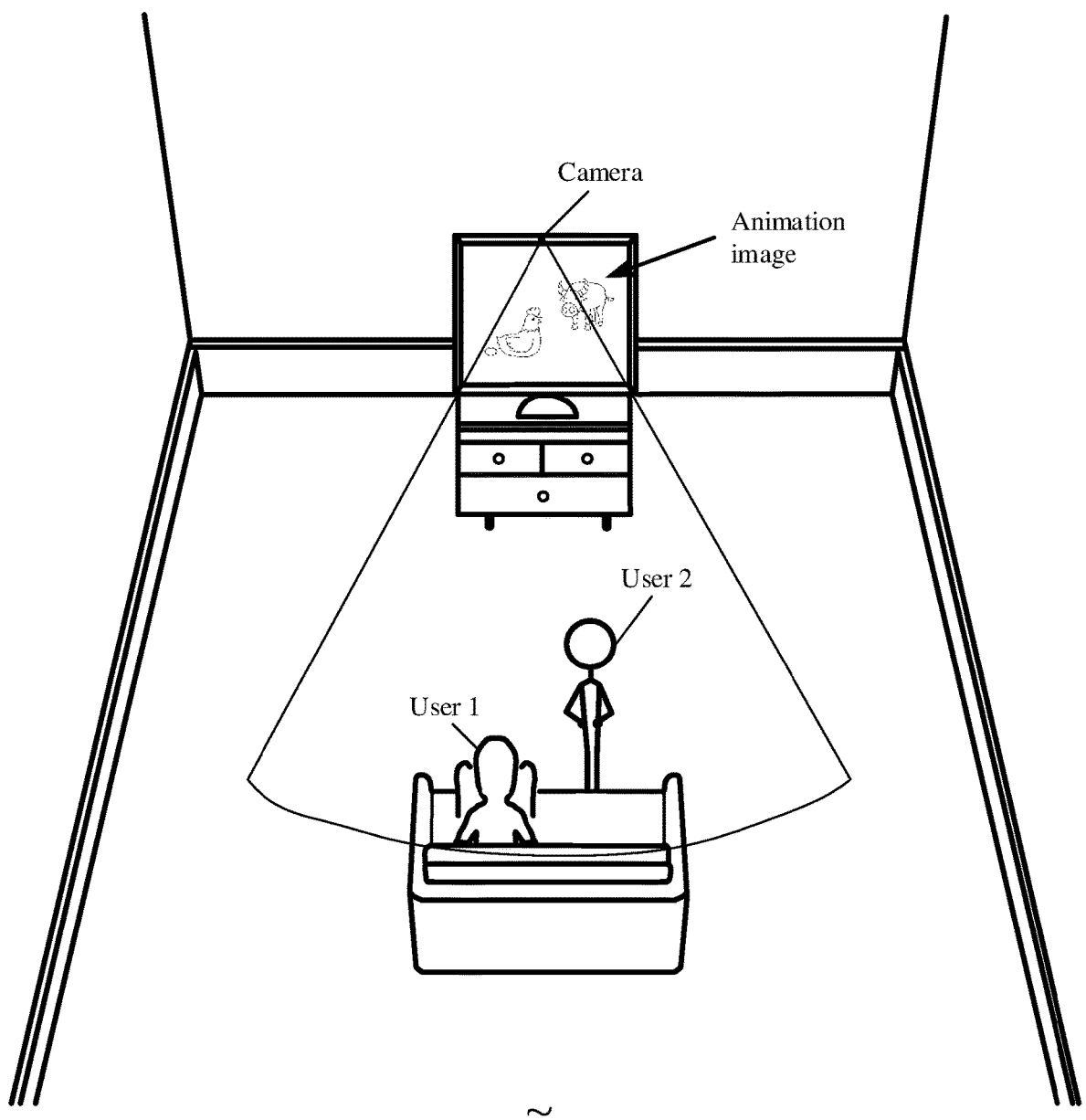
FIG. 8($a$) and FIG. 8($b$) show a schematic diagram of a screen control process according to an embodiment of the present disclosure.
Figure 8B:
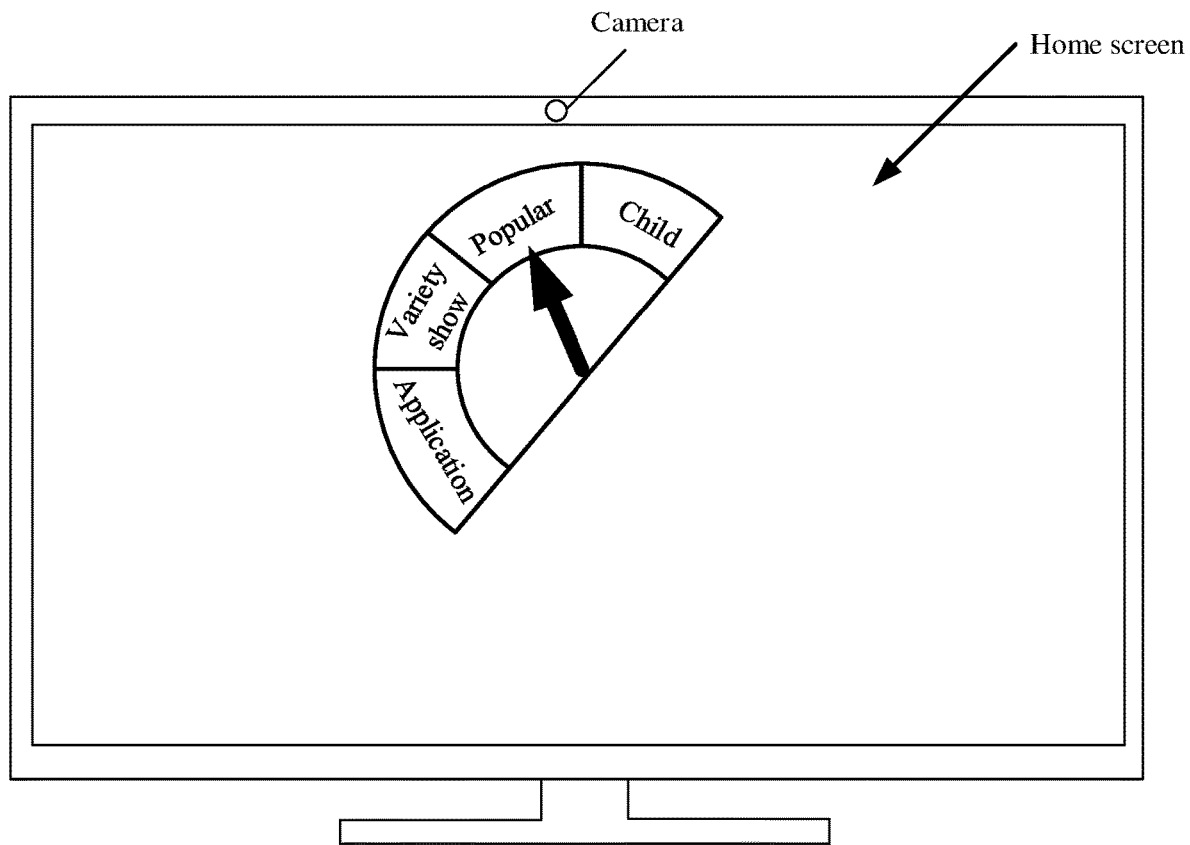

For example, as shown in FIG. 8(*a*), the display of the electronic device displays an animation image, and the action of the target user (the user 2) is forking two arms. It is assumed that forking two arms indicates returning to the home screen. As shown in FIG. 8(*b*), the electronic device responds to forking two arms, and the content displayed on the display of the electronic device is switched from the animation image to the home screen.

For another example, forking a left arm indicates returning to a previous level. The display of the electronic device displays a level 2 menu interface. The action of the target user is forking a left arm (as shown in (b) in FIG. 6). The electronic device responds to forking a left arm, and the content displayed on the display of the electronic device is switched from the level 2 menu interface to a level 1 menu interface.

In some embodiments, the target user determined by the electronic device has control permission. In this case, the electronic device determines the target user as the target user having control permission. For example, the electronic device determines, by using a facial recognition technology, whether the target user has control permission. The electronic device performs facial recognition on the target user, and determines whether a facial image of the target user matches a stored facial image. If the facial image of the target user matches the stored facial image, the target user is the target user having control permission. If the facial image of the target user does not match the stored facial image, the target user is not the target user having control permission.

In some other embodiments, the target user determined by the electronic device does not have control permission. In this case, the electronic device assigns control permission to the target user (S704), and determines the target user as the target user having control permission.

If the electronic device does not assign control permission to any user, the electronic device assigns control permission to the target user.

If the electronic device has assigned control permission to another user, the electronic device transfers the control permission from the user having control permission to the target user. The user having control permission is a user who has interacted with the electronic device within a preset duration. Optionally, the user having control permission may be in front of the screen of the electronic device, and the image captured by the camera of the electronic device includes an image of the user having control permission, but the user having control permission does not perform any preset action. Therefore, the user having control permission is not the target user. If the target user wants to control the electronic device, the electronic device transfers the control permission from the user having control permission to the target user, and the target user becomes the target user having control permission. Alternatively, the user having control permission is not in front of the screen of the electronic device, and the image captured by the camera of the electronic device does not include an image of the user having control permission. Therefore, the user having control permission is not the target user. If the target user wants to control the electronic device, the electronic device transfers the control permission from the user having control permission to the target user, and the target user becomes the target user having control permission.

In addition, in addition to the target user, the image may further include another user. The another user is a user having no control permission. The another user may not perform any action, or an action of the another user does not match the preset action. The electronic device does not respond to the action of the another user in the image other than the target user.

If the quantity of the target users is greater than 1, the electronic device determines whether M target users include a target user having control permission (S705). M is an integer, and 2≤M≤N.

If the M target users include the target user having control permission, the electronic device determines the target user having control permission (S702). In other words, the target user continues to have control permission. The electronic device controls the picture displayed on the screen of the electronic device based on an action of the target user having control permission (S703).

It may be understood that, in a second possible scenario, if there are M target users, the M target users include one target user having control permission. In some embodiments, the electronic device determines, by using the facial recognition technology, whether the target user has control permission. For example, as shown in FIG. 8(a), the display of the electronic device displays the animation image, and the action of the target user (the user 1) is nodding. The action of the target user (the user 2) is forking two arms. It is assumed that nodding indicates pausing the image. Forking two arms indicates returning to the home screen. The user 1 and the user 2 are both target users. The electronic device performs facial recognition on the user 1 and the user 2, and recognizes whether a facial image of the user 1 and a facial image of the user 2 match a stored facial image. It is assumed that the electronic device may match the facial image of the user 2 with the stored facial image. In this case, it is determined that the user 2 is the target user having control permission. As shown in FIG. 8(b), the electronic device responds to forking two arms, and the content displayed on the display of the electronic device is switched from the animation image to the home screen.

In some other embodiments, the electronic device determines, based on a user identifier, whether the target user has control permission. When no user controls the electronic device, the user identifier stored in the electronic device is a special value. When a user operates the electronic device, the electronic device allocates an identifier to the user after identifying the user according to the human pose estimation algorithm. The electronic device stores correspondences between user features and user identifiers. The user identifier may be valid within the preset duration. If the electronic device identifies the user again, the user is the user having control permission. For example, after recognizing the actions of the user 1 and the user 2 according to the human pose estimation algorithm, the electronic device queries the correspondences between user features and user identifiers. Assuming that the electronic device can match a feature of the user 2 with a stored identifier, it is determined that the user 2 is the target user having control permission. As shown in FIG. 8(b), the content displayed on the display of the electronic device is switched from the animation image to the home screen. The feature may be a biological feature of a person. The biometric feature includes but is not limited to a facial feature and a pose feature.

If the M target users do not include the target user having control permission, namely, if none of the M target users has control permission, the electronic device prompts the user to perform an action again, and S301 is performed again. Optionally, the electronic device determines a target user indicated by the user (S706). The electronic device assigns control permission to the target user (S704). The electronic device determines a target user having control permission (S702), and controls the picture displayed on the screen of the electronic device based on an action of the target user having control permission (S703). It may be understood that the target user indicated by the user is a user in a current image captured by the camera of the electronic device.

In a third possible scenario, if none of the M target users has control permission, it indicates that the M target users have not interacted with the electronic device within the preset duration. In a possible implementation, the electronic device may play or display prompt information to prompt a user to respond to an action of a target user. For example, the user 1 and the user 2 are both target users and do not have control permission. The electronic device plays or displays the prompt information to prompt the user whether to respond to the action of the user 1 or the action of the user 2.

Assuming that a user indication received by the electronic device is to respond to the action of the user 2, it is determined that the user 2 is a target user indicated by the user. As shown in FIG. 8(b), it is assumed that the action of the user 2 is forking two arms, and the content displayed on the display of the electronic device is switched from the animation image to the home screen.

Figure 9:
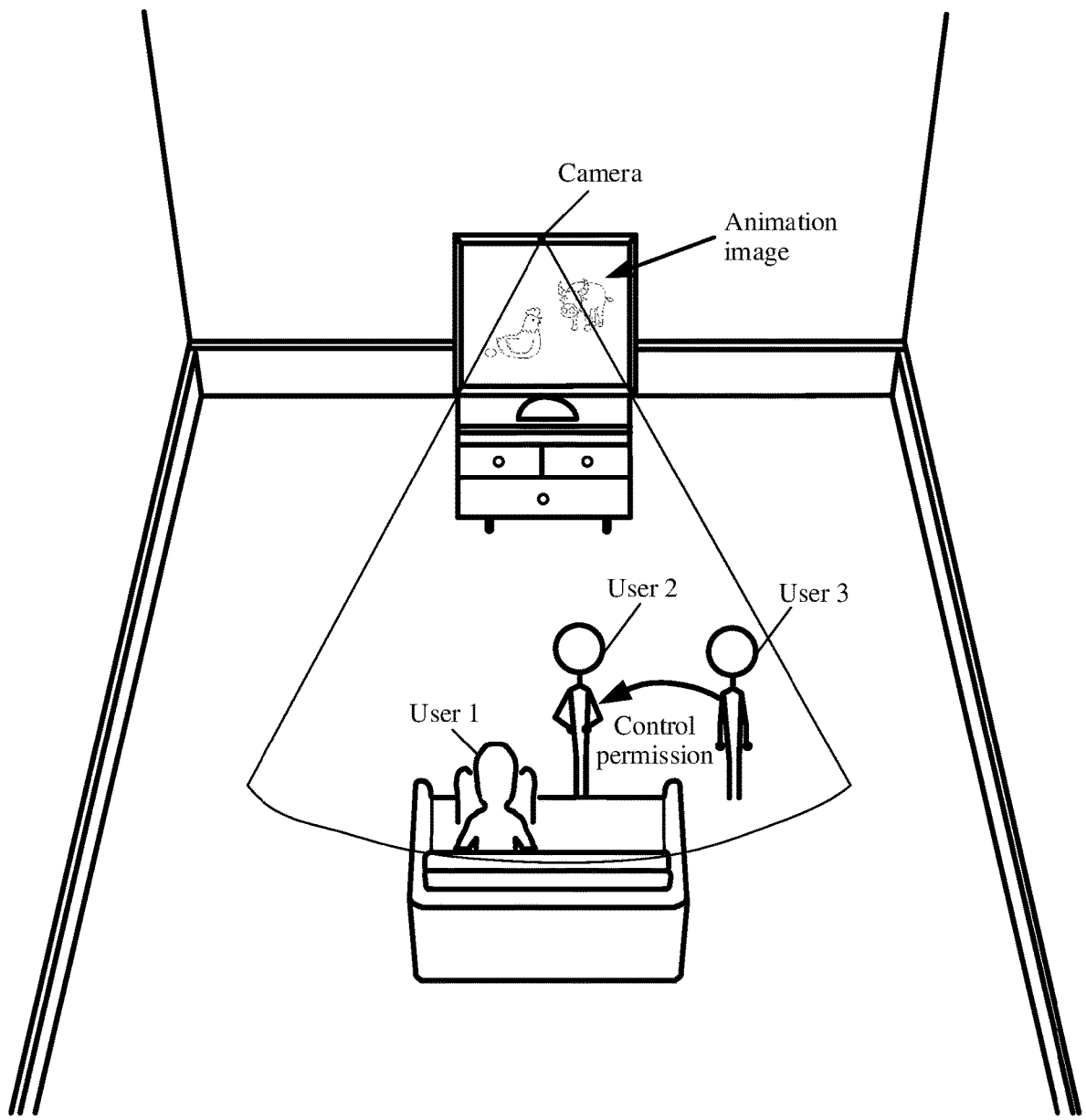
FIG. 9 is a schematic diagram of transferring control permission according to an embodiment of the present disclosure.

In some embodiments, the electronic device may have assigned control permission to another user, and none of the M target users has control permission. In this case, because the another user does not control the electronic device, and the M target users need to control the electronic device, the electronic device transfers the control permission from the user having control permission to the target user indicated by the user (S704). For example, as shown in FIG. 9, the electronic device assigns the control permission to a user 3, the user 1 and the user 2 have not interacted with the electronic device within the preset duration, and neither the user 1 nor the user 2 has control permission. In this case, because the user 3 does not control the electronic device, and the user 1 and the user 2 need to control the electronic device, the electronic device transfers the control permission from the user 3 having control permission to the user 2 indicated by the user.

In some other embodiments, the electronic device may not assign control permission to any user, and none of the M target users has control permission. In this case, the electronic device assigns the control permission to the target user indicated by the user (S704). For example, the electronic device assigns the control permission to the user 2 indicated by the user.

It should be noted that, once the electronic device reassigns the control permission to the user, the preset duration is initiated to 0. If no user controls the electronic device within the preset duration, or the user leaves a field of view (FOV) of the camera of the electronic device, the electronic device automatically releases control permission. Certainly, the user may also perform a release action, and the electronic device releases control permission in response to the release action. When a user operates the electronic device, the control permission is assigned to the user. Therefore, the user controls the electronic device in time.

Figure 10A:
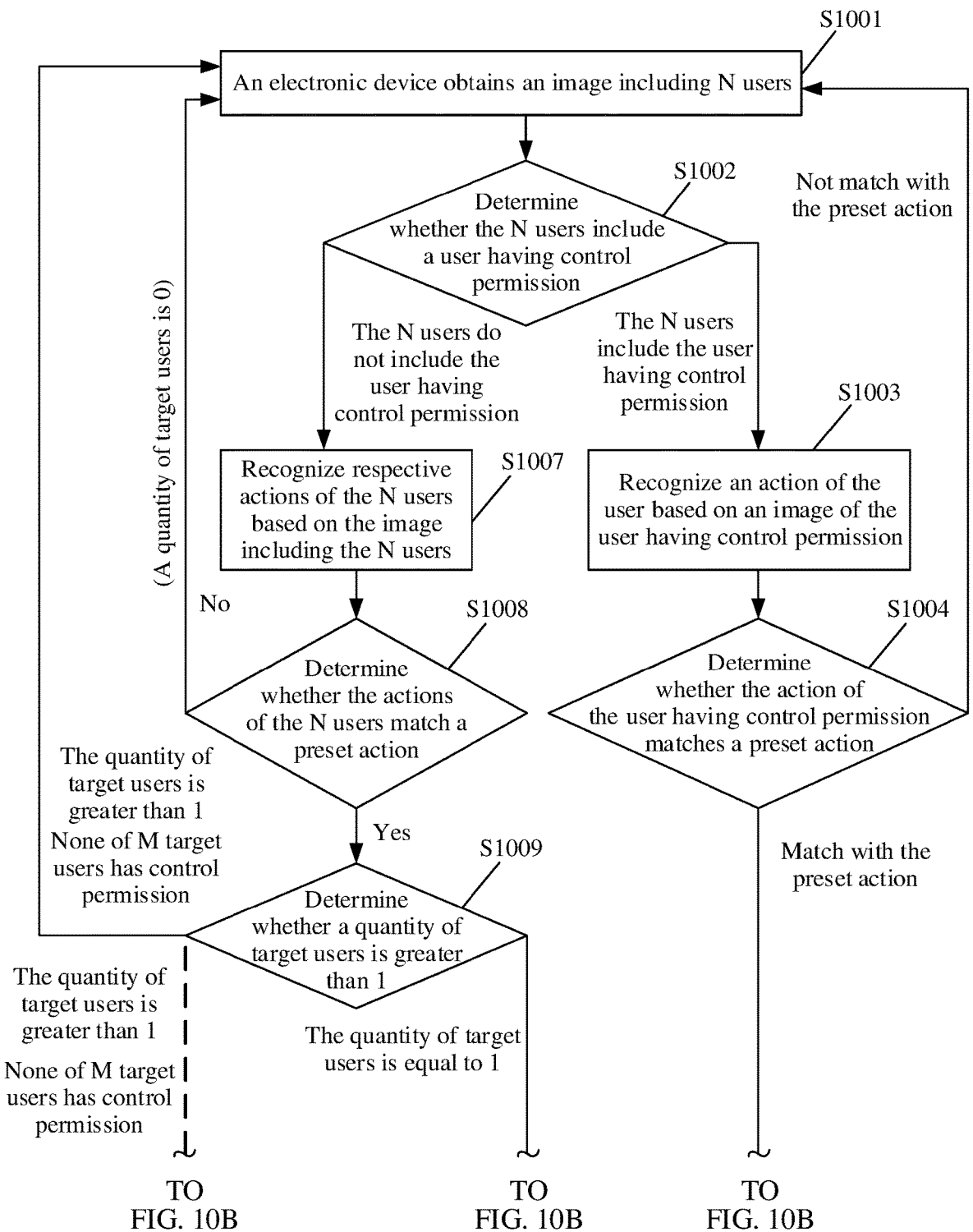
FIG. 10A and FIG. 10B show a schematic flowchart of a screen interaction method for an electronic device according to an embodiment of the present disclosure.
Figure 10B:
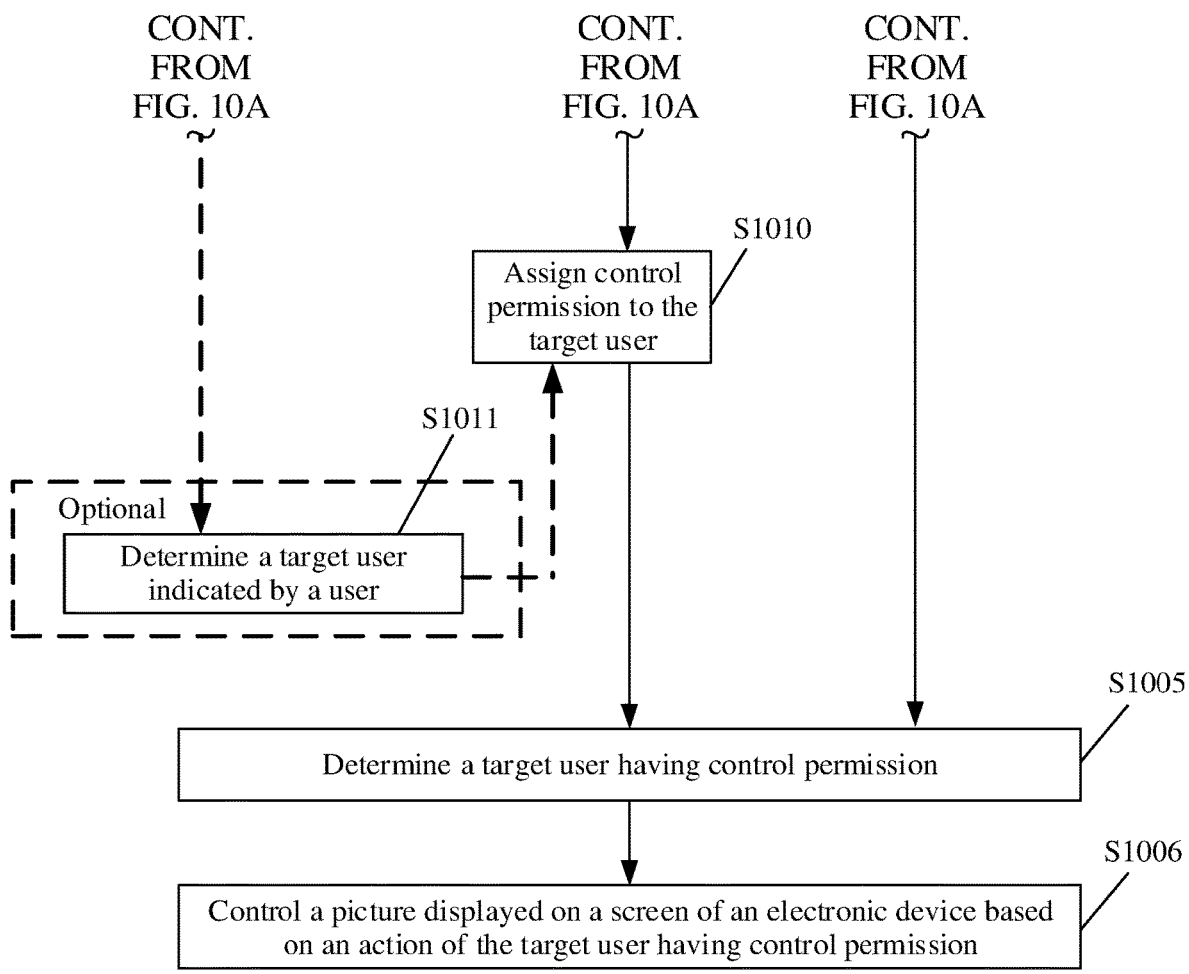

In another example embodiment, the electronic device may first determine whether the user has control permission to determine the target user. For example, as shown in FIG. 10A and FIG. 10B, the method includes the following steps. An electronic device obtains an image including N users (S1001). N is an integer greater than or equal to 2. The electronic device determines, based on the image including the N users, whether the N users include a user having control permission (S1002). The electronic device may determine the user having control permission in the N users by using a facial recognition technology. Alternatively, the electronic device recognizes a feature of the user according to a human pose estimation algorithm, and determines the user having control permission in the N users based on correspondences between user features and user identifiers. For a method for identifying the user having control permission, refer to the descriptions of the foregoing embodiments.

If the N users include the user having control permission, the electronic device recognizes an action of the user based on an image of the user having control permission (S1003). When the electronic device determines whether the N users include the user having control permission, the electronic device determines, by using the facial recognition technology, the user having control permission in the N users. In this case, the electronic device may recognize the action of the user having control permission according to the human pose estimation algorithm.

The electronic device determines whether the action of the user having control permission matches a preset action (S1004). If the action of the user having control permission matches the preset action, the user having control permission is determined as a target user having control permission (S1005). The electronic device controls a picture displayed on a screen of the electronic device based on an action of the target user having control permission (S1006). If the action of the target user having control permission is an action of releasing control permission, the electronic device releases control permission, and S1001 is performed again. If the action of the user having control permission does not match the preset action, it is determined that the user having control permission is not the target user having control permission, and S1001 is performed again. If no user controls the electronic device within a preset duration, or the user leaves a field of view (FOV) of a camera of the electronic device, the electronic device automatically releases control permission.

After the user having control permission is determined, the action of the user having control permission is recognized, so that duration for determining the action of the user is shortened, and the electronic device responds to an operation of the user in time.

Optionally, when determining whether the N users include the user having control permission, the electronic device recognizes actions of the N users according to the human pose estimation algorithm. If the N users include the user having control permission, the action of the user having control permission does not need to be recognized, and the target user having control permission may be determined according to whether the action of the user having control permission matches the preset action.

If the N users do not include the user having control permission, the electronic device recognizes respective actions of the N users based on images of the N users (S1007). In other words, the electronic device recognizes the actions of the N users according to the human pose estimation algorithm. The electronic device determines whether the actions of the N users match a preset action (S1008). If the N users include a user who performs an action matching the preset action, the user who performs the action matching the preset action in the N users is determined as a target user, and the electronic device determines whether a quantity of target users is greater than 1 (S1009). If the N users do not include a user who performs an action matching the preset action, S1001 is performed again.

If the quantity of the target users is equal to 1, the electronic device assigns control permission to the target user (S1010), and determines the target user as a target user having control permission (S1005), and the electronic device controls a picture displayed on a screen of the electronic device based on an action of the target user having control permission (S1006). It may be understood that if the electronic device does not assign control permission to any user, the electronic device assigns the control permission to the target user. For specific descriptions of assigning the control permission, refer to the descriptions in the foregoing embodiments.

If the quantity of the target users is greater than 1, for example, the quantity of the target users is M, and none of the M target users has control permission, the electronic device prompts a user to perform an action again, and S1001 is performed again. Optionally, the electronic device determines a target user indicated by the user (S1011). The electronic device assigns control permission to the target user, namely, the target user indicated by the user (S1010). The electronic device determines the target user indicated by the user as a target user having control permission (S1005), and controls a picture displayed on a screen of the electronic device based on an action of the target user having control permission (S1006). It may be understood that the target user indicated by the user is a user in a current image captured by the camera of the electronic device. For descriptions of the target user indicated by the user, refer to the descriptions in the foregoing embodiments. Details are not described again.

Figure 11:
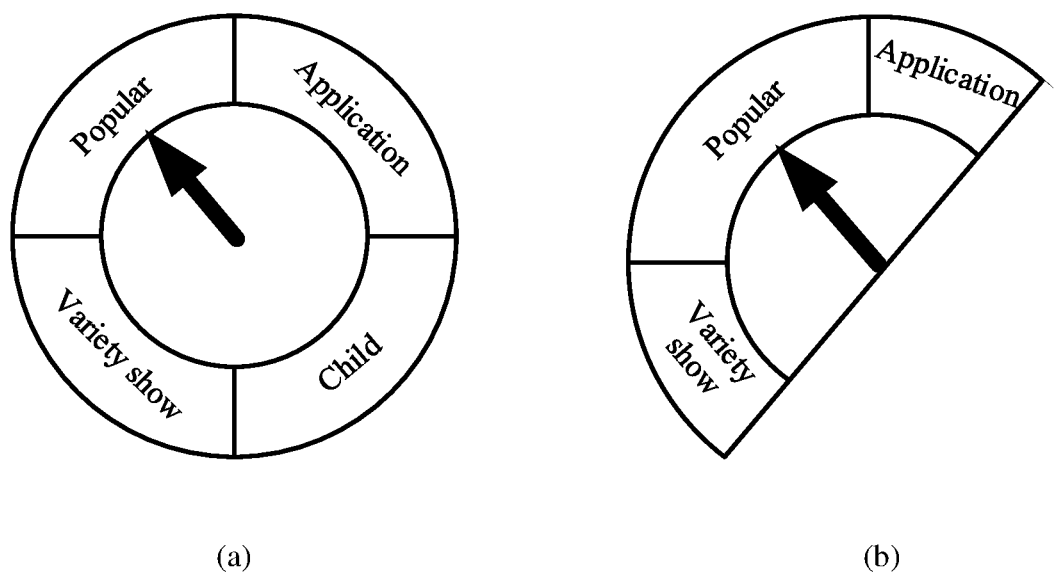
FIG. 11 is a schematic diagram of an operation UI according to an embodiment of the present disclosure.

In an example embodiment, as shown in (a) in FIG. 11, a menu displayed on a screen of the electronic device is a pie menu. As shown in (b) in FIG. 11, a menu displayed on a screen of the electronic device is a roulette menu. A pointer displayed on the screen of the electronic device points to an option on a menu. The electronic device may control, based on a swing angle of a forearm of a target user, the pointer displayed on the screen of the electronic device to point to an option on a menu.

Figure 12:
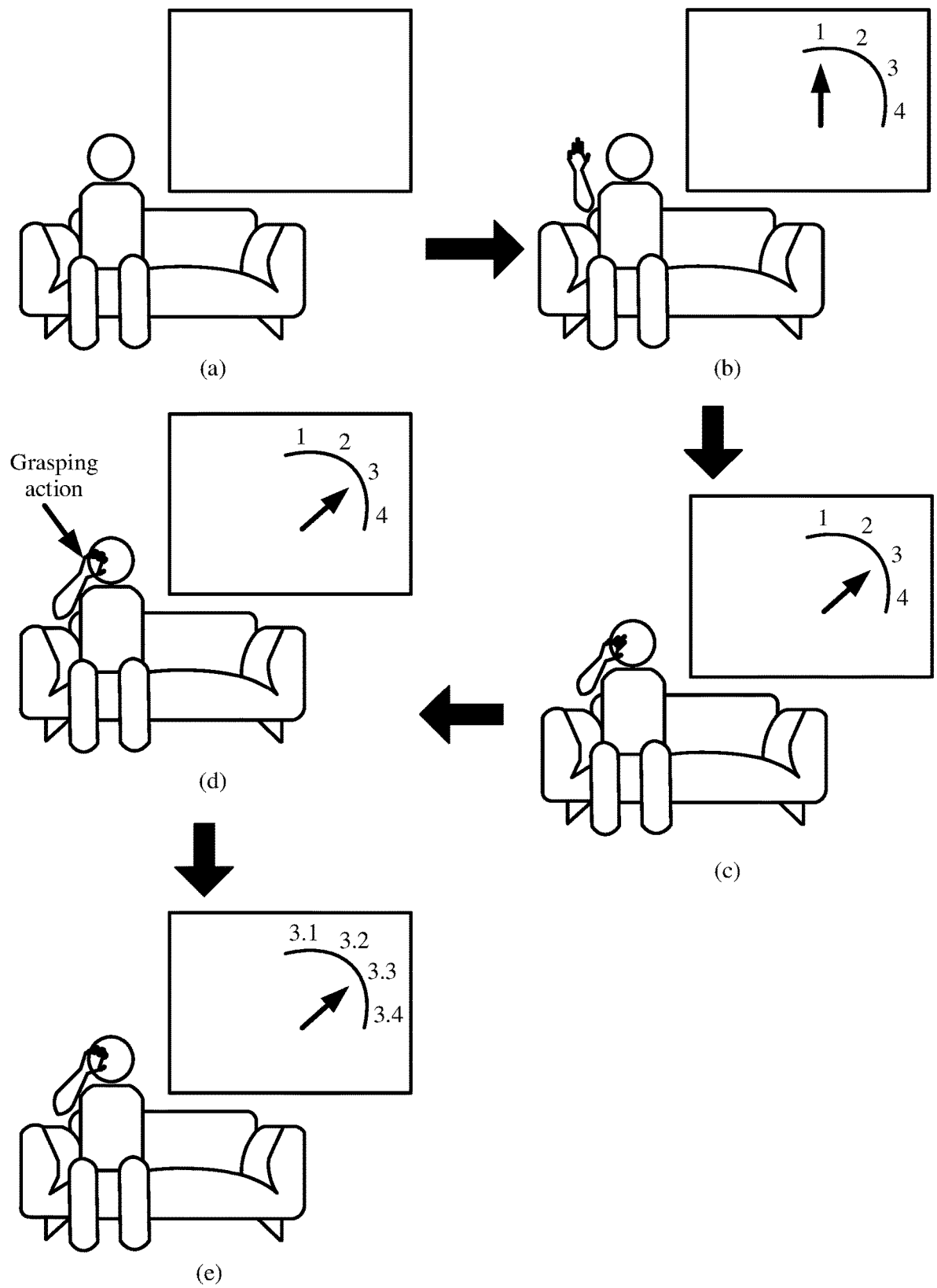
FIG. 12 is a schematic diagram of a screen control process according to an embodiment of the present disclosure.

As shown in (a) in FIG. 12, a user is in a watching state. As shown in (b) in FIG. 12, the user lifts a forearm, and performs a preset action of waking up a body control function, to enable the body control function. As shown in (c) in FIG. 12, the user tilts the forearm to change a forearm pointing angle, and the electronic device may map, based on a rotation angle between the forearm in (b) in FIG. 12 and the forearm in (c) in FIG. 12, the rotation angle to a pointing angle of the pointer in a roulette user interface (UI). In other words, the pointer points to an icon 3 instead of an icon 1.

As shown in (d) in FIG. 12, the user makes a preset gesture, and the electronic device responds to the preset gesture. For example, the user performs a grasping action, and the screen of the electronic device displays an image of an icon 3. As shown in (e) in FIG. 12, the screen of the electronic device displays the image of the icon 3, and the user may perform repeated operations according to (a) to (d) in FIG. 12.

In some embodiments, in an operation manner, a polar coordinate system is used as a basic operation dimension. On a roulette operation UI, a forearm that is a pole axis, an elbow that is a pole point, and a forearm pointing angle that is a basic operation dimension correspond to the roulette UI. In cooperation with gesture recognition, human-machine interaction functions such as quick and accurate selection and determining are implemented. Because it is difficult to define a coordinate origin and a coordinate value range, in the present disclosure, a polar coordinate is used as a basis of a mapping relationship, which is different from an interactive mapping relationship mainly based on a rectangular coordinate system (Descartes coordinate system), to resolve a problem that in the rectangular coordinate system, body actions do not naturally correspond to screen coordinates. The coordinate origin (the elbow is the pole point) and the coordinate value range (0 to 360 degrees) may be naturally defined, so that body actions are more naturally mapped to a screen coordinate system. This reduces interaction space for body interaction, and reduces a fatigue degree of body interaction. Different from an interaction manner in which only hand information is used, an interaction manner of body recognition and gesture recognition is used, so that diversity and flexibility of an interaction instruction are improved, a more complex operation can be performed, and instruction efficiency is improved.

It may be understood that, to implement the functions in the foregoing embodiments, the electronic device includes a corresponding hardware structure and/or software module for performing each function. A person skilled in the art should easily be aware that, in combination with the units and the method steps in the examples described in embodiments disclosed in the present disclosure, these example embodiments can be implemented by hardware or a combination of hardware and computer software. Whether a function is performed by hardware or hardware driven by computer software depends on particular application scenes and design constraints of the technical solutions.

Figure 13:
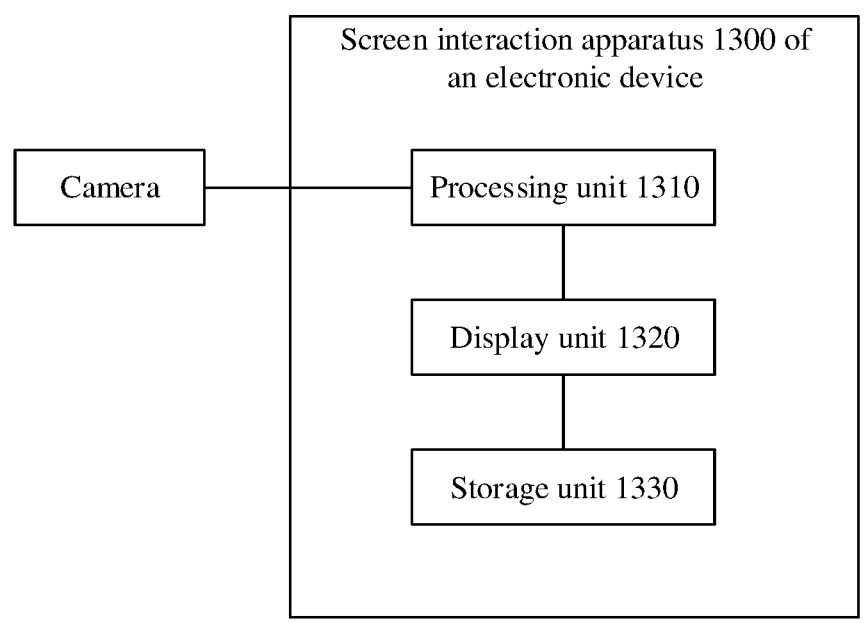
FIG. 13 is a schematic diagram of a screen interaction apparatus for an electronic device according to an embodiment of the present disclosure.

FIG. 13 is an example schematic diagram of a structure of a screen interaction apparatus for an electronic device according to an embodiment of the present disclosure. The screen interaction apparatus for an electronic device may be configured to implement a function of the electronic device in the foregoing method embodiments. Therefore, beneficial effects of the foregoing method embodiments can also be implemented. In this embodiment, the screen interaction apparatus for an electronic device may be the electronic device shown in FIG. 1, or may be a module (for example, a chip) applied to the electronic device.

As shown in FIG. 13, the screen interaction apparatus 1300 for an electronic device includes a processing unit 1310, a display unit 1320, and a storage unit 1330. The screen interaction apparatus 1300 for an electronic device is configured to implement a function of the electronic device in the method embodiments shown in FIG. 3, FIG. 7, and FIG. 10A and FIG. 10B. The storage unit 1330 is configured to: store instructions executed by the processing unit 1310, or store input data required by the processing unit 1310 to run the instructions, or store data generated after the processing unit 1310 runs the instructions. The processing unit 1310 is configured to obtain, by using a camera, an image including N users, to implement a function of the electronic device in the method embodiments shown in FIG. 3, FIG. 7, and FIG. 10A and FIG. 10B. The display unit 1320 is configured to display a picture displayed on a screen that is of the electronic device and that is controlled by the processing unit 1310 based on an action of a target user.

For more detailed descriptions of the processing unit 1310, directly refer to related descriptions in the method embodiments shown in FIG. 3, FIG. 7, and FIG. 10A and FIG. 10B. Details are not described herein. The processing unit 1310 may perform a function of the processor 110 in the electronic device shown in FIG. 1.

It may be understood that the processor in this embodiment may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general purpose processor may be a microprocessor or any regular processor or the like.

The method steps in embodiments of the present disclosure may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

All or some of the foregoing embodiments may be implemented by using software, hardware, firmware, or any combination thereof. When software is used for implementing embodiments, all or some of embodiments may be implemented in a form of a computer program product. The computer program product includes one or more computer programs or instructions. When the computer programs or the instructions are loaded and executed on a computer, the procedures or the functions according to embodiments of the present disclosure are all or partially implemented. The computer may be a general-purpose computer, a dedicated computer, a computer network, a network device, user equipment, or another programmable apparatus. The computer programs or instructions may be stored in a computer-readable storage medium, or may be transmitted from one computer-readable storage medium to another computer-readable storage medium. For example, the computer programs or instructions may be transmitted from one website, computer, server, or data center to another web site, computer, server, or data center in a wired manner or in a wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In embodiments of the present disclosure, unless otherwise stated or there is a logic conflict, terms and/or descriptions between different embodiments are consistent and may be mutually referenced, and technical features in different embodiments may be combined based on an internal logical relationship thereof, to form a new embodiment.

In the present disclosure, "at least one" means one or more, and "a plurality of" means two or more. The term "and/or" describes an association relationship for describing associated objects and represents that any one of three relationships may exist. For example, A and/or B may represent any one of the following three cases: Only A exists, both A and B exist, or only B exists. A and B each may be singular or plural. In the text descriptions of the present disclosure, the character "/" generally indicates an "or" relationship between the associated objects. In a formula in the present disclosure, the character "/" indicates a "division" relationship between the associated objects.

It may be understood that various numbers in embodiments of the present disclosure are merely used for differentiation for ease of description, and are not used to limit the scope of embodiments of the present disclosure. The sequence numbers of the foregoing processes do not mean execution sequences, and the execution sequences of the processes should be determined based on functions and internal logic of the processes.

What is claimed is:

1. A screen interaction method for an electronic device, comprising:
   obtaining an image comprising N users, wherein N is an integer greater than or equal to 2;
   recognizing respective actions of the N users based on the image comprising the N users;
   determining M target users based on the respective actions of the N users, wherein an action of each of the M target users matches a preset action, wherein M is an integer, and 2≤M≤N; and
   controlling a picture displayed on a screen of the electronic device based on the action of one of the M target users,
   wherein, upon determining that none of the M target users has control permission, the controlling a picture displayed on a screen of the electronic device based on the action of one of the M target users comprises:
   controlling the picture displayed on the screen of the electronic device based on an action of a user-specified target user indicated by a user.

2. The method according to claim 1, wherein upon determining that the M target users include a target user having control permission, the controlling a picture displayed on a screen of the electronic device based on the action of one of the M target users comprises:
   controlling the picture displayed on the screen of the electronic device based on an action of the target user having control permission, wherein the target user having control permission is a target user that has interacted with the electronic device within a preset duration.

3. The method according to claim 1, wherein before the controlling a picture displayed on a screen of the electronic device based on the action of one of the M target users, the method further comprises:
   transferring control permission from a user having control permission to the user-specified target user indicated by the user.

4. The method according to claim 1, wherein before the controlling a picture displayed on a screen of the electronic device based on the action of one of the M target users, the method further comprises:
   assigning control permission to the user-specified target user indicated by the user.

5. The method according to claim 1, wherein the preset action comprises one or more of swinging a forearm, forking a left arm, forking a right arm, forking two arms, nodding, or clenching a fist.

6. The method according to claim 5, wherein the preset action is a menu selection action, the controlling a picture displayed on a screen of the electronic device based on the action of the target user comprises:
   controlling, based on a swing angle of a forearm of the target user, a pointer displayed on the screen of the electronic device to point to an option on a menu.

7. The method according to claim 6, wherein the menu displayed on the screen of the electronic device is a menu in a ring shape or in a roulette wheel shape.

8. A screen interaction method for an electronic device, comprising:
   obtaining an image comprising N users, wherein N is an integer greater than or equal to 2;
   determining, based on the image comprising the N users, whether the N users comprise a user having control permission;
   upon determining that the N users comprise the user having control permission, determining the user having control permission as a target user having control permission, wherein an action of the target user having control permission matches a preset action;
   upon determining that the N users do not comprise the user having control permission, and the N users comprise M target users, determining one target user as a target user having control permission, wherein an action of the target user matches a preset action, M is an integer, and 1≤M≤N; and
   controlling a picture displayed on a screen of the electronic device based on the action of the target user having control permission,
   wherein M≥2, and the determining one target user as a target user having control permission comprises:
   assigning control permission to the one target user indicated by a user, and determining the one target user indicated by the user as the target user having control permission.

9. A screen interaction apparatus for an electronic device, comprising at least one processor configured to:
   obtain an image comprising N users, wherein N is an integer greater than or equal to 2;
   recognize respective actions of the N users based on the image comprising the N users;
   determine M target users based on the respective actions of the N users, wherein an action of each of the M target users matches a preset action, wherein M is an integer, and 2≤M≤N; and
   control a picture displayed on a screen of the electronic device based on the action of one of the M target users,
   wherein, upon determining that none of the M target users has control permission, the controlling a picture displayed on a screen of the electronic device based on the action of one of the M target users comprises:
   controlling the picture displayed on the screen of the electronic device based on an action of a user-specified target user indicated by a user.

10. The apparatus according to claim 9, wherein upon determining that the M target users include a target user having control permission, the controlling a picture displayed on a screen of the electronic device based on the action of the one of the M target users comprises
    controlling the picture displayed on the screen of the electronic device based on an action of the target user having control permission, wherein the target user having control permission is a target user that has interacted with the electronic device within a preset duration.

11. The apparatus according to claim 9, wherein the at least one processor is further configured to:
    transfer control permission from a user having control permission to the user-specified target user indicated by the user.

12. The apparatus according to claim 9, wherein the at least one processor is further configured to:
    assign control permission to the user-specified target user indicated by the user.

13. The apparatus according to claim 9, wherein the preset action comprises one or more of swinging a forearm, forking a left arm, forking a right arm, forking two arms, nodding, or clenching a fist.

14. The apparatus according to claim 13, wherein the preset action is a menu selection action, the at least one processor is further configured to:
   control, based on a swing angle of a forearm of the target user, a pointer displayed on the screen of the electronic device to point to an option on a menu.

15. The apparatus according to claim 14, wherein the menu displayed on the screen of the electronic device is a menu in a ring shape or in a roulette wheel shape.

\* \* \* \* \*

UNITED STATES PATENT AND TRADEMARK OFFICE
CERTIFICATE OF CORRECTION

| | | |
|---|---|---|
| PATENT NO. | : 12,126,864 B2 | Page 1 of 1 |
| APPLICATION NO. | : 18/154090 | |
| DATED | : October 22, 2024 | |
| INVENTOR(S) | : Siwei Liu | |

It is certified that error appears in the above-identified patent and that said Letters Patent is hereby corrected as shown below:

In the Specification

Column 12, Line 44, change "holds a first" to -- holds a fist --;

Column 12, Line 45, change "first on the waits" to -- fist on the waist --;

Column 13, Line 5, change "Clenching a first" to -- Clenching a fist --; and

Column 13, Line 7, change "clenching a first" to -- clenching a fist --.

Signed and Sealed this
Nineteenth Day of November, 2024

Katherine Kelly Vidal
*Director of the United States Patent and Trademark Office*